United States Patent
Fujioka et al.

[11] 3,885,862
[45] May 27, 1975

[54] ZOOM LENS

[75] Inventors: Yoshisato Fujioka; Tetsuro Ishizuka, both of Tokyo, Japan

[73] Assignee: Kabushiki Kaisha Yashica, Japan

[22] Filed: Oct. 5, 1973

[21] Appl. No.: 403,830

[30] Foreign Application Priority Data
Oct. 9, 1972  Japan.............................. 47-101150

[52] U.S. Cl.................................. 350/186; 350/214
[51] Int. Cl......................... G02b 15/00; G02b 9/00
[58] Field of Search..................... 350/184, 186, 214

[56] References Cited
UNITED STATES PATENTS

| | | | |
|---|---|---|---|
| 3,377,119 | 4/1968 | Takano............................. | 350/184 |
| 3,751,136 | 8/1973 | Kirckhoff........................... | 350/184 |
| 3,784,283 | 1/1974 | Muszumanski..................... | 350/184 |
| 3,784,285 | 1/1974 | Watenabe et al................... | 350/184 |

*Primary Examiner*—Ronald L. Wibert
*Assistant Examiner*—Conrad Clark
*Attorney, Agent, or Firm*—Steinberg & Blake

[57] ABSTRACT

A zoom lens composed of four groups of lenses which have a common optical axis with the first three groups which are situated from the front toward the rear along the common optical axis be movable along the optical axis. The first group of lenses consists of three lenses the first two of which have a combined focal length which when divided by the focal length of the third lens is less than 3 but greater than 2. The radius of the rear surface of the second lens of the first group divided into 1 is less than 0 but greater than −1 divided by 5 times the focal length of the first group. The second group of lenses includes three lenses forming the fourth, fifth, and sixth lens of the zoom lens, with the fifth and sixth lens contacting each other. The radius of the front surface of the fifth lens divided by the radius of the rear surface of the sixth lens has a value which is less than 2.5 but greater than 1.0. The difference between the refractive indices of the fifth and sixth lenses with respect to the $d$-line divided by the radius of curvature of the common surface between fifth and sixth lenses and multiplied by the focal length of the second group of lenses is less than 0.15.

8 Claims, 12 Drawing Figures

ZOOM LENS

BACKGROUND OF THE INVENTION

The present invention relates to camera objectives.

In particular, the present invention relates to zoom lenses.

In general, it is known to follow certain steps in order to enable photographs to be made with a high degree of magnification. These steps are:

1. Within a conjugate distance of about 1 m the lens members which form a first group of lenses situtated at the front of the zoom lens are moved along the optical axis.

2. Additional lens members are provided for close-up photographs.

3. Photographs are made at particular focal lengths and at particular distances by moving lens members of some groups individually of the movement of the lens members of the zooming group.

However, it has been found that with step 1 above, the degree of magnification is low. For example, when making photographs with an 8 mm motion picture camera, the degree of magnification is about −0.06 in the case of eight-fold zooming with a focal length of F = 7.5–60 mm and the conjugate distance of 1.2 mm, and also about −0.06 in the case of six-fold zooming with a focal length of F = 8–48 mm and a conjugate distance of 1 m.

In the case of steps 2 and 3 above, it is impossible to carry out continuous photography up to a degree of high magnification and in addition in the case of step 3 a zooming operation cannot be achieved.

SUMMARY OF THE INVENTION

It is accordingly a primary object of the present invention to provide zoom lenses which will avoid the above drawbacks.

Thus, it is an object of the present invention to provide zoom lenses which are of relatively simple construction while at the same time having the capability of carrying on continuous photographic operations up to a high degree of magnification while at the same time being capable of compensating for aberration over the entire variable magnification range of lens members of a first group of lenses which have a relatively small effective aperture ratio.

Thus, more specifically, it is an object of the present invention to provide a zoom lens which while being relatively low in its flexibility is at the same time simple in its construction and is capable of taking continuous photographs at a conjugate distance range from infinity to 0.3 m while at the same time achieving a zooming operation by increasing the refractive power of lens members of the first and second groups of lenses of the zoom lens.

With the zoom lenses of the present invention, while the focal length of the lens members of the first group have a relatively small effective aperture, the zoom lens has a focal range of 9.0–30.0 mm, the aperture ratio of the zoom lens is 1 : 1.9, and the maximum degree of magnification is −0.15. With the zoom lens of the present invention it is possible to achieve a good compensation of aberration with the range of maximum magnification being −0.15, while fulfilling the above requirements.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
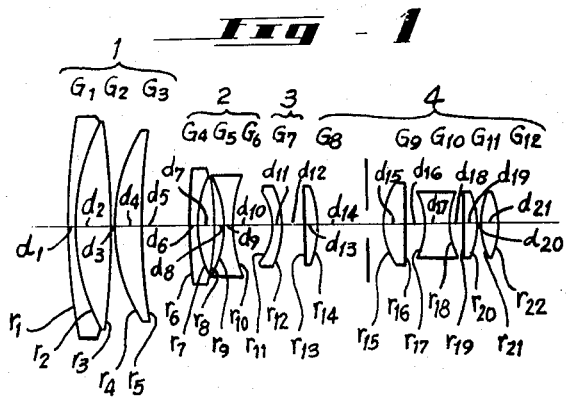
FIG. 1 is a schematic illustration of one embodiment of a zoom lens according to the invention, this embodiment of FIG. 1 including 12 lenses divided into four groups where the first and second groups each have three lenses, the third group has one lens, and the fourth group has five lenses with the diagram situated between the first and second lens of the fourth group.
Figure 2:
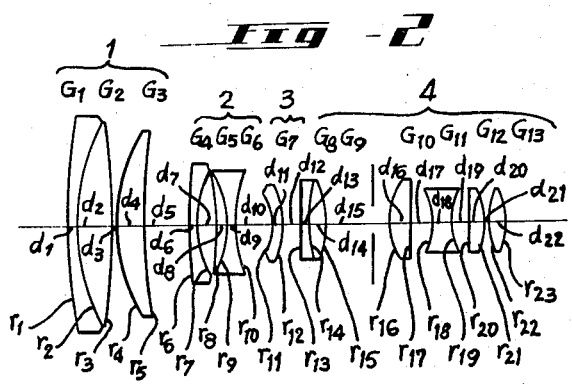
FIG. 2 is a schematic representation of a second embodiment of a zoom lens according to the invention made up of thirteen lenses divided also into four groups where the first and second groups each have three lenses, the third group has a single lens, and the fourth group has six lenses the first two of which are cemented together with the diaphragm located between the second and third lenses of the fourth group.
Figure 3:
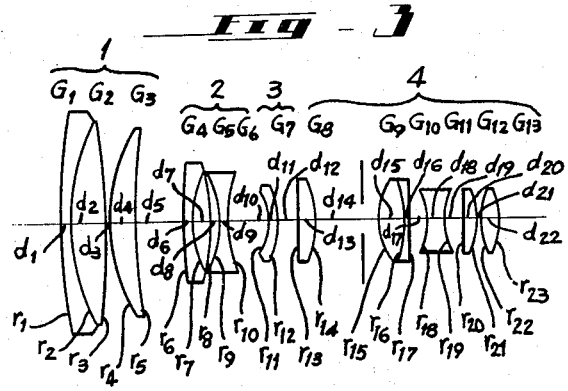
FIG. 3 is a schematic illustration of a third embodiment of a zoom lens according to the invention, the zoom lens of FIG. 3 also including thirteen lenses divided into four groups where the first and second groups each have three lenses, the third group has a single lens, and the fourth group has six lenses where the second and third lenses of the fourth group are cemented together with the diaphragm situated between the first and second lenses of the fourth group.

Referring now to FIGS. 1–3, each of the illustrated embodiments of the invention the zoom lens has at its front end, shown at the left in FIGS. 1–3, a first means for performing an image-composing function, this first means including a first group 1 of lenses having a positive refracting power and consisting of three lens members $G_1$, $G_2$, and $G_3$. In all of three embodiments, the first lens $G_1$ is a negative meniscus lens having a forwardly directed convex surface. The second lens $G_2$ is a positive lens whose convex surface of greater curvature is directed forwardly toward the object. These first two lenses $G_1$ and $G_2$ are directly in contact with each other as by being cemented together so as to be capable of performing a focusing function. The third lens $G_3$ of the first group of each embodiment is a positive meniscus lens whose convex surface is also directed forwardly toward the object.

Behind the first means is a second means for performing the function of varying the magnification, this second means including the lens group 2 consisting of three lens $G_4$, $G_5$, and $G_6$ which respectively form the fourth, fifth and sixth lens of the zoom lens. This second group 2 has a negative refracting power. The fourth lens $G_4$ is a negative meniscus lens whose convex surface is directed forwardly toward the object. The fifth lens $G_5$ is a positive meniscus lens whose convex surface of greater curvature is directed rearwardly toward the image plane. The third lens $G_6$ of the second group is negative lens whose concave surface of greater curvature is forwardly directed toward the object. These two rear lenses of group 2, namely lenses $G_5$ and $G_6$, are directly in contact with each other as by being cemented together, so that they are capable of performing a diverging function. Thus it will be seen that in the first group the first two lenses $G_1$ and $G_2$ have a common surface of radius $r_2$, while in the second group last two lenses $G_5$ and $G_6$ have a common surface of radius $r_9$.

The first and second means which include the lens groups 1 and 2 have the illustrated common optical axis and are each movable along the optical axis for carrying out their functions. Behind the second means is a third means for compensating for the change in the focal point resulting from movement of the second group lenses along the optical axis. This third means includes the lens group 3 which has a negative refracting power and which consists of the single meniscus lens $G_7$ whose concave surface is forwardly directed toward the object. The third means which includes lens group 3 is also movable along the optical axis.

The zoom lens of each of the embodiments of FIGS. 1–3 is completed by a fourth means which includes the lens group 4, this fourth means also performing an image-composing function and consisting of four positive lenses and at least one negative lens. Thus, in the case of FIG. 1 it will be seen that the fourth means includes lens group 4 consisting of the four positive lenses $G_8$, $G_9$, $G_{11}$ and $G_{12}$, with the negative lens $G_{10}$ being situated between the lenses $G_9$, $G_{11}$, and with a diaphragm being schematically illustrated between the lenses $G_8$ and $G_9$.

In the case of FIG. 2, the fourth means includes the lens group 4 consisting of six lenses $G_8$–$G_{13}$ of which the lenses $G_8$ and $G_{11}$ are negative lenses while the remaining lenses are positive, and in this case the lenses $G_8$ and $G_9$ are cemented together so as to have a common surface of radius $r_{14}$ while the diaphragm is schematically illustrated between the lenses $G_9$ and $G_{10}$.

In the case of FIG. 3, the fourth means includes the lens group 4 consisting of six lenses $G_8$–$G_{13}$ of which lenses $G_{10}$ and $G_{11}$ are negative lenses while the remaining lenses are positive, and in this case the lenses $G_9$ and $G_{10}$ are cemented together so as to have a common surface of radius $r_{16}$. In this case the diaphragm is situated between the lenses $G_8$ and $G_9$.

It will be noted from the drawings and the description above that it is an easy matter with the zoom lens according to the present invention to situate between the lens members $G_8$ and $G_9$ of FIGS. 1 and 3 and between the lens members $G_9$ and $G_{10}$ of FIG. 2 a branched prism for a single lens reflex camera, a diaphragm, as illustrated, or the like, and it will be understood that the insertion of parallel and plane glass elements mentioned above in the lens system of the invention is within the scope of the invention.

Thus, by moving along the optical axis the first, second, and third means which respectively include the groups 1, 2 and 3 are capable of performing, respectively, an image composing function with respect to a finite object, the function of varying the magnification, and the function of compensating for the change in the focal point resulting from movement of the second lens group 2 along the optical axis.

It is possible to achieve a good compensation for aberration if certain requirements are met. Thus, considering the first group 1, the following requirements are maintained:

$$3 > f_{(G_1+G_2)}/f_{G_3} > 2, \; 0 > \frac{1}{r_3} > -\frac{1}{5f_1}$$

where $f_{(G_1+G_2)}$ is the combined focal length of lenses $G_1$ and $G_2$, $f_{G_3}$ is the focal length of lens $G_3$, $r_3$ is the radius of curvature of the rear surface of lens $G_2$, and $f_1$ is the focal length of lens group 1.

With respect to the second group, the following requirements are maintained:

$$2.5 > -r_8/r_{10} > 1.0, \; 0.15 > \frac{n_5 - n_6}{r_9} f_2$$

where $r_8$, $r_9$, and $r_{10}$ are respectively the radii of curvature of the front surface of lens $G_5$, the common surface between lenses $G_5$ and $G_6$ and the rear surface of lens $G_6$, while $n_5$ are respectively refractive indices with respect to the d-line of lenses $G_5$ and $G_6$, and $f_2$ is the focal length of lens group 2. It is to be noted that the ratio $-r_8/r_{10}$ is always negative, as is apparent from the relationship set forth above and from the description which follows.

In order to obtain the high degreee of aberration compensation which is achieved with the zoom lens of the invention, it is necessary that changes both in the aberration resulting from changing the magnification and the aberration resulting from photographing an object at a relatively small distance are maintained as small as possible while at the same time aberration which has no relation with respect to photographing an object at a short distance from the camera but resulting with conventional structures in a change in magnification is eliminated. It is in fact extremely difficult to maintain as small as possible the aberration changes resulting from variations in magnification.

Accordingly, it is generally desirable that the extent of movement of lens group 1 along the optical axis is limited to a small range while the refractive power of lens group 1 is increased to the extent that is permitted by aberration, so as to enhance the degree of magnification. Movement of the second lens group 2 along the optical axis is necessary in order to change the degree of magnification, and is also restricted to a small range of movement so as to make the effective aperture of the first group 1 smaller, while the refractive power of the second group 2 is increased within the limits permitted by aberration.

The zoom lenses of the invention are capable of achieving the extremely great advantage of being very effective when making exposures at a short distance, with the zoom lens of the invention being arranged in such a way that the refractive powers of the first and second groups 1 and 2 are increased, the aperture ratio of the first group 1 at a long focal distance is 0.53, and the higher-order aberration resulting from increase in the aperture ratio of the first group is overcome by the following requirements: Thus, in order that the conjugate distance compensates the image surface at a long distance somewhat more than is necessary in order to make up for the great insufficiency of compensation at a relatively short photographing distance while keeping the change in aberration as small as possible, the following requirements are met as set forth above:

$$3 > f_{(c_1+c_2)}/f_{c_3} \cdot r_3 < 0$$

When $f_{(c_1+c_2)}/f_{c_3}$ is larger than 3 and $r_3$ is larger than 0, the convergence of light rays coming into the peripheral region of the lens members from the flux of incident oblique light rays is increased at the side of long focal distance, the curvature of the fourth surface, namely the front surface of $G_3$, becomes too large, and the aberration of distortion at the side of short focal distance becomes larger also, thus making compensation difficult.

On the other hand, since movement of the back side principal point of the first group 1 toward the image plane serves to increase the refractive power of the first group 1, and in order to achieve a more advantageous aberration compensation with respect to the wide angle of view, the following requirements are provided:

$$f_{(c_1+c_2)}/f_{c_3} > 2, \quad \frac{1}{r_3} > -\frac{1}{5f_1}$$

In the second group 2 the following requirement is maintained:

$$2.5 > -r_8/r_{10} > 1.0$$

When $-r_8/r_{10}$ is less than the lower limit 1.0, the distortion at the side of short focal length becomes larger, thus breaking the equivalence existing between spherical aberration and curvature of field. It is desirable to maintain $-r_8/r_{10}$ greater than 1.0 for the purpose of preventing chromatic and coma aberration from changing due to change in magnification. The upper limit 2.5 is intended to diverge the image surface so as to compensate advantageously for the aberration of the first group 1.

The requirement $0.15 > n_5 - n_6/r_9 f_2$ is provided in order to give a positive refracting power to lens members $G_5$ and $G_6$ by allowing the common surface therebetween to have a convex configuration relative the image surface and advantageously compensate for the negative distortion at the side of short focal length.

The addition of excessive positive refracting power prevents an extremely insufficient compensation of the curvature aberration of the image surface.

The details of specific examples of the embodiments of FIGS. 1–3 are respectively set forth in the following three tables, the headings of which refer to the embodiments of FIGS. 1–3, respectively, wherein the zoom lens has a focal range $f = 9.0 - 30.0$ mm, an aperture ratio of 1 : 1.9, a diagonal of effective image surface of 7.1 mm, with the three lens groups 1–3 of each embodiment respectively having the focal lengths $f_1 = 31.4$, $f_2 = -10.70$, and $f_3 = -21.0$. The first column of each table contains the radii of curvature of the successive lens surfaces, the second column of each table contains the distance from one surface to the next surface of the several lenses, the third column contains the refractive indices with respect to the $d$-line of the several lenses, and the fourth column contains the Abbe numbers of the several lenses.

Embodiment 1 (see FIG. 1)

| | | | |
|---|---|---|---|
| $r_1 = +76.025$ | $d_1 = 1.14$ | $n_1 = 1.78472$ | $v_1 = 25.7$ |
| $r_2 = +27.438$ | $d_2 = 5.02$ | $n_2 = 1.71300$ | $v_2 = 53.9$ |
| $r_3 = -379.08$ | $d_3 = 0.10$ | | |
| $r_4 = +22.850$ | $d_4 = 4.25$ | $n_3 = 1.64000$ | $v_3 = 60.2$ |
| $r_5 = +115.012$ | $d_5 =$ Variable | | |
| $r_6 = +115.00$ | $d_6 = 0.86$ | $n_4 = 1.62041$ | $v_4 = 60.3$ |
| $r_7 = +12.941$ | $d_7 = 2.32$ | | |
| $r_8 = -29.426$ | $d_8 = 1.81$ | $n_5 = 1.78472$ | $v_5 = 25.7$ |
| $r_9 = -13.148$ | $d_9 = 0.84$ | $n_6 = 1.64000$ | $v_6 = 60.2$ |
| $r_{10} = +22.105$ | $d_{10} =$ Variable | | |
| $r_{11} = -7.446$ | $d_{11} = 0.83$ | $n_7 = 1.67270$ | $v_7 = 32.2$ |
| $r_{12} = -16.451$ | $d_{12} =$ Variable | | |
| $r_{13} = \infty$ | $d_{13} = 2.10$ | $n_8 = 1.71300$ | $v_8 = 53.9$ |
| $r_{14} = -11.905$ | $d_{14} = 9.00$ | | |
| $r_{15} = +9.269$ | $d_{15} = 3.43$ | $n_9 = 1.74330$ | $v_9 = 49.2$ |
| $r_{16} = -276.78$ | $d_{16} = 2.52$ | | |
| $r_{17} = -11.104$ | $d_{17} = 2.87$ | $n_{10} = 1.78472$ | $v_{10} = 25.7$ |
| $r_{18} = +11.104$ | $d_{18} = 2.04$ | | |
| $r_{19} = +255.20$ | $d_{19} = 2.23$ | $n_{11} = 1.62041$ | $v_{11} = 60.3$ |
| $r_{20} = -12.686$ | $d_{20} = 0.10$ | | |
| $r_{21} = +19.386$ | $d_{21} = 2.00$ | $n_{12} = 1.62041$ | $v_{12} = 60.3$ |
| $r_{22} = -32.200$ | | | |

When focal lengths are 9.0 mm, 16.2 mm and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 3.210 |
| 16.2 | 6.541 | 5.556 | 3.262 |
| 30.0 | 11.421 | 2.782 | 1.156 |

Embodiment 2 (see FIG. 2)

| | | | |
|---|---|---|---|
| $r_1 = +76.025$ | $d_1 = 1.14$ | $n_1 = 1.78472$ | $v_1 = 25.7$ |
| $r_2 = +27.438$ | $d_2 = 5.02$ | $n_2 = 1.71300$ | $v_2 = 53.9$ |
| $r_3 = -379.08$ | $d_3 = 0.10$ | | |
| $r_4 = +22.850$ | $d_4 = 4.25$ | $n_3 = 1.64000$ | $v_3 = 60.2$ |
| $r_5 = +115.012$ | $d_5 =$ Variable | | |
| $r_6 = +115.00$ | $d_6 = 0.86$ | $n_4 = 1.62041$ | $v_4 = 60.3$ |
| $r_7 = +12.941$ | $d_7 = 2.32$ | | |
| $r_8 = -29.426$ | $d_8 = 1.81$ | $n_5 = 1.78472$ | $v_5 = 25.7$ |
| $r_9 = -13.148$ | $d_9 = 0.84$ | $n_6 = 1.64000$ | $v_6 = 60.2$ |
| $r_{10} = +22.105$ | $d_{10} =$ Variable | | |
| $r_{11} = -7.446$ | $d_{11} = 0.83$ | $n_7 = 1.67270$ | $v_7 = 32.2$ |
| $r_{12} = -16.451$ | $d_{12} =$ Variable | | |
| $r_{13} =$ | $d_{13} = 1.00$ | $n_8 = 1.71736$ | $v_8 = 29.5$ |

—Continued

Embodiment 2 (see FIG. 2)

| | | | |
|---|---|---|---|
| $r_{14} = +40.000$ | $d_{14} = 2.10$ | $n_9 = 1.71300$ | $v_9 = 53.9$ |
| $r_{15} = -12.882$ | $d_{15} = 9.0$ | | |
| $r_{16} = +9.269$ | $d_{16} = 3.43$ | $n_{10} = 1.74330$ | $v_{10} = 49.2$ |
| $r_{17} = -276.78$ | $d_{17} = 2.52$ | | |
| $r_{18} = -11.104$ | $d_{18} = 2.87$ | $n_{11} = 1.78472$ | $v_{11} = 25.7$ |
| $r_{19} = +11.104$ | $d_{19} = 2.04$ | | |
| $r_{20} = +255.20$ | $d_{20} = 2.23$ | $n_{12} = 1.620421$ | $v_{12} = 60.3$ |
| $r_{21} = -12.686$ | $d_{21} = 0.10$ | | |
| $r_{22} = +19.386$ | $d_{22} = 2.00$ | $n_{13} = 1.620421$ | $v_{13} = 60.3$ |
| $r_{23} = -32.200$ | | | |

When focal lengths are 9.0 mm, 16.2 mm and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 2.625 |
| 16.2 | 6.541 | 5.556 | 2.677 |
| 30.0 | 11.421 | 2.782 | 0.571 |

Embodiment 3 (see FIG. 3)

| | | | |
|---|---|---|---|
| $r_1 = +76.025$ | $d_1 = 1.14$ | $n_1 = 1.78472$ | $v_1 = 25.7$ |
| $r_2 = +27.438$ | $d_2 = 5.02$ | $n_2 = 1.71300$ | $v_2 = 53.7$ |
| $r_3 = -379.08$ | $d_3 = 0.10$ | | |
| $r_4 = +22.850$ | $d_4 = 4.25$ | $n_3 = 1.64000$ | $v_3 = 60.2$ |
| $r_5 = +115.012$ | $d_5 =$ Variable | | |
| $r_6 = +115.00$ | $d_6 = 0.86$ | $n_4 = 1.62041$ | $v_4 = 60.3$ |
| $r_7 = +12.941$ | $d_7 = 2.32$ | | |
| $r_8 = -29.426$ | $d_8 = 1.81$ | $n_5 = 1.78472$ | $v_5 = 25.7$ |
| $r_9 = -13.148$ | $d_9 = 0.84$ | $n_6 = 1.64000$ | $v_6 = 60.2$ |
| $r_{10} = +22.105$ | $d_{10} =$ Variable | | |
| $r_{11} = -7.446$ | $d_{11} = 0.83$ | $n_7 = 1.67270$ | $v_7 = 32.2$ |
| $r_{12} = -16.451$ | $d_{12} =$ Variable | | |
| $r_{13} =$ | | | |
| $r_{14} = -12.905$ | $d_{13} = 2.10$ | $n_8 = 1.71300$ | $v_8 = 53.9$ |
| $r_{15} = +9.269$ | $d_{14} = 9.00$ | | |
| $r_{16} = -40.000$ | $d_{15} = 3.43$ | $n_9 = 1.74330$ | $v_9 = 49.2$ |
| $r_{17} = -276.78$ | $d_{16} = 0.80$ | $n_{10} = 1.74400$ | $v_{10} = 44.9$ |
| | $d_{17} = 21.4$ | | |

Embodiment 3 (see FIG. 3)

| | | | |
|---|---|---|---|
| $r_{18} = -11.104$ | $d_{18} = 2.87$ | $n_{11} = 1.78472$ | $v_{11} = 25.7$ |
| $r_{19} = +11.104$ | $d_{19} = 2.04$ | | |
| $r_{20} = +255.20$ | $d_{20} = 2.23$ | $n_{12} = 1.62041$ | $v_{12} = 60.3$ |
| $r_{21} = -12.686$ | $d_{21} = 0.60$ | | |
| $r_{22} = +19.386$ | $d_{22} = 2.00$ | $n_{13} = 1.62041$ | $v_{13} = 60.3$ |
| $r_{23} = -31.724$ | | | |

When focal lengths are 900 mm, 16.2 mm, and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 3.210 |
| 16.2 | 6.541 | 5.556 | 3.262 |
| 30.0 | 11.421 | 2.782 | 1.156 |

Figure 4A:
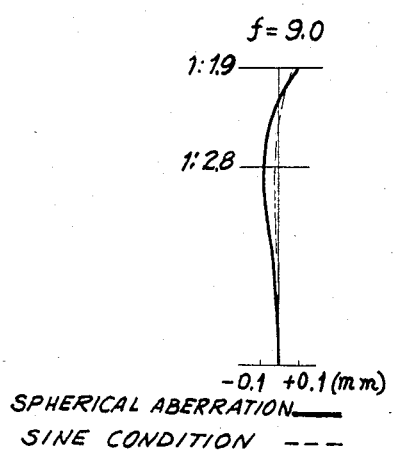
FIGS. 4A, 5A and 6A are respectively graphical representations of spherical aberration and sine condition for the embodiment of FIG. 1 for focal lengths which respectively are $f = 9.0$, $f = 16.2$, and $f = 30.0$.
Figure 5A:
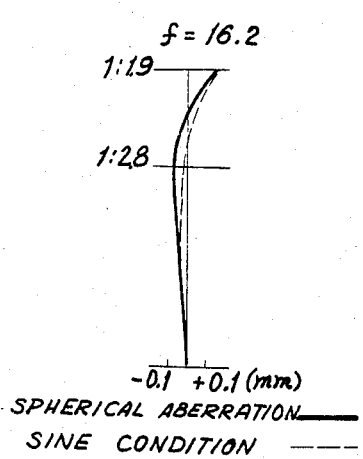
Figure 6A:
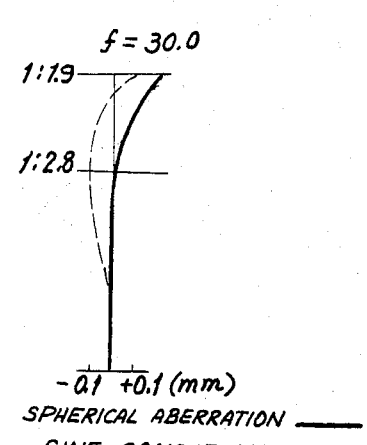
Figure 4B:
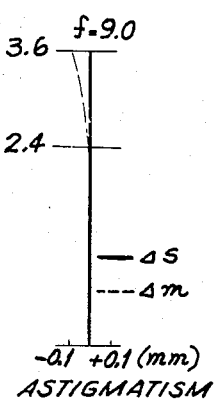
FIGS. 4B, 5B and 6B are respectively graphical illustrations of astigmatism of the embodiment of FIG. 1 for focal lengths which are respectively $f = 9.0$, $f = 16.2$, and $f = 30.0$.
Figure 5B:
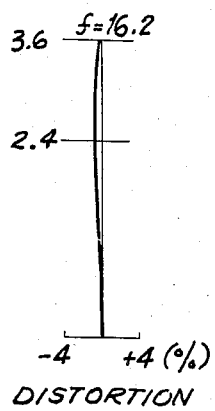
Figure 6B:
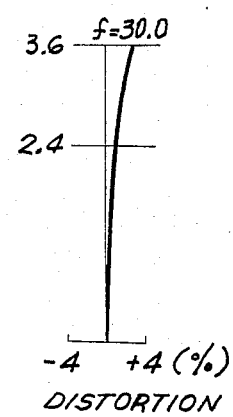
Figure 4C:
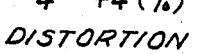
FIGS. 4C, 5C and 6C are respectively graphical illustrations of distortion for the embodiment of FIG. 1 for focal lengths which respectively are $f = 9.0$, $f = 16.2$, and $f = 30.0$.
Figure 5C:
Figure 6C:
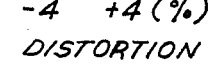

With all three embodiments set forth above, aberration values achieved by tracing of light rays have almost the same compensation. Therefore, the aberration curves illustrated in FIGS. 4A–6C are illustrated for the embodiment of FIG. 1 as being typical for all embodiments. FIGS. 4A, 5A and 6A respectively illustrate spherical aberration and sine condition for focal lengths of $f = 9.0$, $f = 16.2$, and $f = 30.0$ of the embodiment of FIG. 1. FIGS. 4B, 5B and 6B respectively illustrate astigmatism for the embodiment of FIG. 1 with focal lengths, respectively, of $f = 9.0$, $f = 16.2$, and $f = 30.0$. FIGS. 4C, 5C and 6C respectively illustrate distortion for the embodiment of FIG. 1 for focal lengths, respectively, of $f = 9.0$, $f = 16.2$, and $f = 30.0$.

Seidel coefficients for the embodiment of FIG. 1 for focal lengths of $f = 9.0$, $f = 16.2$, and $f = 30.0$ are set forth respectively in the following three tables which have suitable headings for identification, with the first column of each of the following three tables indicating the successive lens surfaces from the front toward the rear. The second column B represents spherical surface aberration, column F represents coma aberration, the third column C represents astigmatism, the next column P represents the Petzval sum, and the last column E represents distortion. The totals are set forth as the last item of each column.

The various Seidel coefficients are calculated in a well known manner. For an explanation of how these values are calculated reference may be made to FUNDAMENTALS OF OPTICAL ENGINEERING, by Donald H. Jacobs, McGraw-Hill Book Company, New York, 1943 and THE PRINCIPLES OF OPTICS, by Arthur C. Hardy and Fred H. Perrin, McGraw-Hill Book Company, New York, 1932.

List of Seidel's Coefficients in Embodiment 1 (f = 9.0)

| | B | F | C | P | E |
|---|---|---|---|---|---|
| 1 | 0.0004 | 0.0023 | 0.0127 | 0.0521 | 0.3617 |
| 2 | −0.0013 | 0.0010 | −0.0007 | −0.0077 | 0.0062 |
| 3 | 0.0007 | −0.0086 | 0.1018 | 0.0099 | −1.3296 |
| 4 | 0.0031 | 0.0033 | 0.0034 | 0.1537 | 0.1633 |
| 5 | 0.0068 | −0.0501 | 0.3678 | −0.0305 | −2.4768 |
| 6 | −0.0067 | 0.0493 | −0.3618 | 0.0300 | 2.4365 |
| 7 | −0.0558 | 0.0086 | −0.0013 | −0.2663 | 0.0414 |
| 8 | −0.0017 | 0.0114 | −0.0777 | −0.1345 | 1.4463 |
| 9 | 0.0117 | −0.0334 | 0.0950 | 0.0338 | −0.3672 |
| 10 | −0.1722 | −0.0041 | −0.0001 | −0.1589 | −0.0038 |
| 11 | −0.4082 | 0.3776 | −0.3494 | −0.4861 | 0.7729 |

—Continued

List of Seidel's Coefficients in Embodiment 1 (f = 9.0)

|    | B       | F       | C       | P       | E       |
|----|---------|---------|---------|---------|---------|
| 12 | −0.0189 | −0.0672 | −0.2392 | 0.2200  | −0.0682 |
| 13 | 1.2089  | 0.3559  | 0.1048  | 0.      | 0.0309  |
| 14 | 1.3186  | −0.7474 | 0.4236  | 0.2903  | −0.4047 |
| 15 | 3.5824  | 1.0716  | 0.3206  | 0.4140  | 0.2197  |
| 16 | 4.0261  | −1.1241 | 0.3139  | 0.0139  | −0.0915 |
| 17 | −10.1863| 0.7751  | −0.0590 | −0.3564 | 0.0316  |
| 18 | −0.2947 | −0.3673 | −0.4577 | −0.3564 | −1.0145 |
| 19 | 0.0004  | 0.0042  | 0.0410  | 0.0135  | 0.5291  |
| 20 | 0.9905  | −0.0116 | 0.0001  | 0.2716  | −0.0032 |
| 21 | −0.0006 | −0.0096 | −0.1616 | 0.1777  | 0.2730  |
| 22 | 1.2032  | 0.0309  | 0.0008  | 0.1070  | 0.0028  |
| SUM| 1.2064  | 0.2681  | 0.0771  | −0.0092 | 0.5559  |

List of Seidel's Coefficients in Embodiment 1 (f = 16.2)

|    | B       | F       | C       | P       | E       |
|----|---------|---------|---------|---------|---------|
| 1  | 0.0024  | 0.0037  | 0.0057  | 0.0937  | 0.1533  |
| 2  | −0.0076 | 0.0149  | −0.0292 | −0.0139 | 0.0847  |
| 3  | 0.0042  | −0.0342 | 0.2798  | 0.0178  | −2.4318 |
| 4  | 0.0183  | −0.0179 | 0.0176  | 0.2767  | −0.2886 |
| 5  | 0.0398  | −0.2242 | 1.2643  | −0.0550 | −6.8190 |
| 6  | −0.0353 | 0.1972  | −1.1027 | 0.0539  | 5.8628  |
| 7  | −0.0522 | −0.0068 | −0.0009 | −0.4793 | −0.0623 |
| 8  | −0.0154 | 0.0819  | −0.4364 | −0.2421 | 3.6152  |
| 9  | 0.0306  | −0.0830 | 0.2254  | 0.0609  | −0.7776 |
| 10 | −0.1799 | −0.0663 | −0.0244 | −0.2860 | −0.1143 |
| 11 | −0.2183 | 0.3669  | −0.6166 | −0.8750 | 2.5069  |
| 12 | −0.0109 | −0.0684 | −0.4310 | 0.3960  | −0.2200 |
| 13 | 0.6716  | 0.3559  | 0.1887  | 0.      | 0.1000  |
| 14 | 0.7326  | −0.7474 | 0.7626  | 0.5225  | −1.3111 |
| 15 | 1.9902  | 1.0716  | 0.5770  | 0.7452  | 0.7119  |
| 16 | 2.2367  | −1.1241 | 0.5649  | 0.0250  | −0.2965 |
| 17 | −5.6590 | 0.7751  | −0.1062 | −0.6415 | 0.1024  |
| 18 | −0.1637 | −0.3673 | −0.8239 | −0.6415 | −3.2869 |
| 19 | 0.0002  | 0.0042  | 0.0737  | 0.0243  | 1.7142  |
| 20 | 0.5503  | −0.0116 | 0.0002  | 0.4889  | −0.0103 |
| 21 | −0.0003 | −0.0096 | −0.2909 | 0.3199  | 0.8846  |
| 22 | 0.6684  | 0.0309  | 0.0014  | 0.1926  | 0.0090  |
| SUM| 0.6026  | 0.1417  | 0.0992  | −0.0166 | 0.1267  |

List of Seidel's Coefficients in Embodiment 1 (f = 30.00)

|    | B       | F       | C       | P       | E        |
|----|---------|---------|---------|---------|----------|
| 1  | 0.0151  | −0.0091 | 0.0054  | 0.1735  | −0.1073  |
| 2  | −0.0481 | 0.1199  | −0.2990 | −0.0256 | 0.8097   |
| 3  | 0.0266  | −0.1555 | 0.9091  | 0.0329  | −5.5069  |
| 4  | 0.1161  | −0.2279 | 0.4472  | 0.5124  | −1.8829  |
| 5  | 0.2525  | −1.1308 | 5.0631  | −0.1018 | −22.2143 |
| 6  | −0.1934 | 0.8576  | −3.8030 | 0.0999  | 16.4204  |
| 7  | −0.0214 | −0.0110 | −0.0057 | −0.8876 | −0.4608  |
| 8  | −0.1042 | 0.4484  | −1.9301 | 0.4483  | 10.2362  |
| 9  | 0.0895  | −0.2362 | 0.6229  | 0.1128  | −1.9407  |
| 10 | −0.1350 | −0.1207 | −0.1079 | −0.5296 | −0.5698  |
| 11 | −0.4109 | 0.9065  | −1.9999 | −1.6203 | 7.9871   |
| 12 | −0.0004 | −0.0178 | −0.7539 | 0.7334  | −0.8692  |
| 13 | 0.3627  | 0.3559  | 0.3494  | 0.      | 0.3429   |
| 14 | 0.3956  | −0.7474 | 1.4121  | 0.9676  | −4.4962  |
| 15 | 1.0747  | 1.0716  | 1.0685  | 1.3800  | 2.4415   |
| 16 | 1.2078  | −1.1241 | 1.0462  | 0.0462  | −1.0167  |
| 17 | −3.0559 | 0.7751  | −0.1966 | −1.1879 | 0.3512   |
| 18 | −0.0884 | −0.3673 | −1.5257 | −1.1879 | −11.2721 |
| 19 | 0.0001  | 0.0042  | 0.1365  | 0.0450  | 5.8785   |
| 20 | 0.2971  | −0.0116 | 0.0005  | 0.9054  | −0.0353  |
| 21 | −0.0002 | −0.0096 | −0.5386 | 0.5925  | 3.0337   |
| 22 | 0.3610  | 0.0309  | 0.0027  | 0.3567  | 0.0308   |
| SUM| 0.1412  | 0.4015  | −0.0968 | −0.0307 | −2.8401  |

What is claimed is:

1. In a zoom lens having a front end to be directed toward an object to be photographed and a rear end to be directed toward an image plane of a camera, first means situated at said front end for carrying out an image-composing function with respect to a finite object, second means situated behind said first means for varying magnification, said first and second means having a common optical axis and being movable therealong, third means situated along said optical axis behind said second means and being movable therealong for compensating for a change in focal point produced by movement of said second means along said optical axis, and fourth means situated behind said third means along said optical axis for composing an image, said fourth means being fixed with respect to said optical axis, said first means including a first lens group of positive refracting power and consisting of three lens members which include from the front toward the rear a first negative meniscus lens having a forwardly directed convex surface, a second positive lens having a forwardly directed convex surface of greater curvature than its rearwardly directed convex surface, with said forwardly directed convex surface of said second lens contacting the rear surface of said first lens for providing a focusing function therewith, and a third positive meniscus lens having a forwardly directed convex surface, said second means including a second lens group having a negative refracting power and consisting of three lens members forming the fourth, fifth, and sixth lens, respectively, of the zoom lens, said fourth lens being a negative meniscus lens having a forwardly directed convex surface, said fifth lens being a positive meniscus lens having a rearwardly directed convex surface of greater curvature than its forwardly directed surface, and said sixth lens being a negative lens whose concave forwardly directed surface is of greater curvature than its rearwardly directed surface, said fifth and sixth lenses engaging each other and having a diverging function, said third means including a third lens group having a negative refracting power and consisting of a negative meniscus lens having a forwardly directed concave surface, said fourth means including a fourth lens group having a positive refracting power and consisting of four positive lens members and at least one negative lens member.

2. The combination of claim 1 and wherein for a focal length range of the zoom lens $f = 9.0 \sim 30.0$ mm, for an aperture ratio 1 : 1.9, for a diagonal of effective image surface of 7.1 mm, and for focal lengths for the first, second and third lens groups which are respectively $f_1 = 31.4$, $f_2 = -10.70$, and $f_3 = -21.0$, the zoom lens has the data presented in the following table headed Embodiment 1 (see FIG. 1), where the zoom lens includes 12 lenses with the successive surfaces of the lenses from the front to the rear having the radii of curvature indicated in the first column, where the distances between the successive lens surfaces have the values indicated in the second column, where the refractive indices of the successive lenses with respect to the d-line are indicated in the third column, and where the Abbe numbers are indicated in the fourth column:

Embodiment 1 (see FIG. 1)

| | | | |
|---|---|---|---|
| $r_1 = +76.025$ | | | |
| | $d_1 = 1.14$ | $n_1 = 1.78472$ | $v_1 = 25.7$ |
| $r_2 = +27.438$ | | | |
| | $d_2 = 5.02$ | $n_2 = 1.71300$ | $v_2 = 53.9$ |
| $r_3 = -379.08$ | | | |
| | $d_3 = 0.10$ | | |
| $r_4 = +22.850$ | | | |
| | $d_4 = 4.25$ | $n_3 = 1.64000$ | $v_3 = 60.2$ |
| $r_5 = +115.012$ | | | |
| | $d_5 =$ Variable | | |
| $r_6 = +115.00$ | | | |
| | $d_6 = 0.86$ | $n_4 = 1.62041$ | $v_4 = 60.3$ |
| $r_7 = +12.941$ | | | |
| | $d_7 = 2.32$ | | |
| $r_8 = -29.426$ | | | |
| | $d_8 = 1.81$ | $n_5 = 1.78472$ | $v_5 = 25.7$ |
| $r_9 = -13.148$ | | | |
| | $d_9 = 0.84$ | $n_6 = 1.64000$ | $v_6 = 60.2$ |
| $r_{10} = +22.105$ | | | |
| | $d_{10} =$ Variable | | |
| $r_{11} = -7.446$ | | | |
| | $d_{11} = 0.83$ | $n_7 = 1.67270$ | $v_7 = 32.2$ |
| $r_{12} = -16.451$ | | | |
| | $d_{12} =$ Variable | | |
| $r_{13} = -$ | | | |
| | $d_{13} = 2.10$ | $n_8 = 1.71300$ | $v_8 = 53.9$ |

-Continued

Embodiment 1 (see FIG. 1)

| | | | |
|---|---|---|---|
| $r_{14} = -12.905$ | | | |
| | $d_{14} = 9.00$ | | |
| $r_{15} = +9.269$ | | | |
| | $d_{15} = 3.43$ | $n_9 = 1.74330$ | $v_9 = 49.2$ |
| $r_{16} = -276.78$ | | | |
| | $d_{16} = 2.52$ | | |
| $r_{17} = -11.104$ | | | |
| | $d_{17} = 2.87$ | $n_{10} = 1.78472$ | $v_{10} = 25.7$ |
| $r_{18} = +11.104$ | | | |
| | $d_{18} = 2.04$ | | |
| $r_{19} = +255.20$ | | | |
| | $d_{19} = 2.23$ | $n_{11} = 1.62041$ | $v_{11} = 60.3$ |
| $r_{20} = -12.686$ | | | |
| | $d_{20} = 0.10$ | | |
| $r_{21} = -19.386$ | | | |
| | $d_{21} = 2.00$ | $n_{12} = 1.62041$ | $v_{12} = 60.3$ |
| $r_{22} = -32.200$ | | | |

When focal lengths are 9.0 mm, 16.2 mm and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 3.210 |
| 16.2 | 6.541 | 5.556 | 3.262 |
| 30.0 | 11.421 | 2.782 | 1.156. |

3. The combination of claim 1 and wherein for a focal length range of the zoom lens $f = 9.0 \sim 30.0$ mm, for an aperture ratio 1 : 1.9, for a diagonal of effective image surface of 7.1 mm, and for focal lengths for the first, second and third lens groups which are respectively $f_1 = 31.4$, $f_2 = -10.70$, and $f_3 = -21.0$, the zoom lens has the data presented in the following table headed Embodiment 2 (see FIG. 2), where the zoom lens includes 13 lenses with the successive surfaces of the lenses from the front to the rear having the radii of curvature indicated in the first column, where the distances between the successive lens surfaces have the values indicated in the second column, where the refractive indices of the successive lenses with respect to the d-line are indicated in the third column, and where the Abbe numbers are indicated in the fourth column:

Embodiment 2 (see FIG. 2)

| | | | |
|---|---|---|---|
| $r_1 = +76.025$ | | | |
| | $d_1 = 1.14$ | $n_1 = 1.78472$ | $v_1 = 25.7$ |
| $r_2 = +27.438$ | | | |
| | $d_2 = 5.02$ | $n_2 = 1.71300$ | $v_2 = 53.9$ |
| $r_3 = -379.08$ | | | |
| | $d_3 = 0.10$ | | |
| $r_4 = +22.850$ | | | |
| | $d_4 = 4.25$ | $n_3 = 1.64000$ | $v_3 = 60.2$ |
| $r_5 = +115.012$ | | | |
| | $d_5 =$ Variable | | |
| $r_6 = +115.00$ | | | |
| | $d_6 = 0.86$ | $n_4 = 1.62041$ | $v_4 = 60.3$ |
| $r_7 = +12.941$ | | | |
| | $d_7 = 2.32$ | | |
| $r_8 = -29.426$ | | | |
| | $d_8 = 1.81$ | $n_5 = 1.78472$ | $v_5 = 25.7$ |
| $r_9 = -13.148$ | | | |
| | $d_9 = 0.84$ | $n_6 = 1.64000$ | $v_6 = 60.2$ |
| $r_{10} = +22.105$ | | | |
| | $d_{10} =$ Variable | | |
| $r_{11} = -7.446$ | | | |
| | $d_{11} = 0.83$ | $n_7 = 1.67270$ | $v_7 = 32.2$ |
| $r_{12} = -16.451$ | | | |
| | $d_{12} =$ Variable | | |
| $r_{13}' =$ | | | |
| | $d_{13} = 1.00$ | $n_8 = 1.71736$ | $v_8 = 29.5$ |
| $r_{14} = +40.000$ | | | |
| | $d_1 = 2.10$ | $n_9 = 1.71300$ | $v_9 = 53.9$ |
| $r_{15} = -12.882$ | | | |

-Continued

Embodiment 2 (see FIG. 2)

| | | | | | |
|---|---|---|---|---|---|
| $r_{16} = +9.269$ | $d_{15} = 9.0$ | | | | |
| $r_{17} = -276.78$ | $d_{16} = 3.43$ | $n_{10} = 1.74330$ | $v_{10} = 49.2$ | | |
| $r_{18} = -11.104$ | $d_{17} = 2.52$ | | | | |
| $r_{19} = +11.104$ | $d_{18} = 2.87$ | $n_{11} = 1.78472$ | $v_{11} = 25.7$ | | |
| $r_{20} = +255.20$ | $d_{19} = 2.04$ | | | | |
| $r_{21} = -12.686$ | $d_{20} = 2.23$ | $n_{12} = 1.620421$ | $v_{12} = 60.3$ | | |
| $r_{22} = +19.386$ | $d_{21} = 0.10$ | | | | |
| $r_{23} = -32.200$ | $d_{22} = 2.00$ | $n_{13} = 1.620421$ | $v_{13} = 60.3$ | | |

When focal lengths are 9.0 mm, 16.2 mm and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 2.625 |
| 16.2 | 6.541 | 5.556 | 2.677 |
| 30.0 | 11.421 | 2.782 | 0.571. |

4. The combination of claim 1 and wherein for a focal length range of the zoom lens $f = 9.0 \sim 30.0$ mm, for an aperture ratio 1 : 1.9, for a diagonal of effective image surface of 7.1 mm, and for focal lengths for the first, second and third lens groups which are respectively $f_1 = 31.4$, $f_2 = -10.70$, and $f_3 = -21.0$, the zoom lens has the date presented in the following table headed Embodiment 3 (see FIG. 3), where the zoom lens includes 13 lenses with successive surfaces of the lenses from the front to the rear having the radii of curvature indicated in the first column, where the distances between the successive lens surfaces have the values indicated in the second column, where the refractive indices of the successive lenses with respect to the d-line are indicated in the third column, where the Abbe numbers are indicated in the fourth column:

Embodiment 3 (see FIG. 3)

| | | | | | |
|---|---|---|---|---|---|
| $r_1 = +76.025$ | $d_1 = 1.14$ | $n_1 = 1.78472$ | $v_1 = 25.7$ | | |
| $r_2 = +27.438$ | $d_2 = 5.02$ | $n_2 = 1.71300$ | $v_2 = 53.7$ | | |
| $r_3 = -379.08$ | $d_3 = 0.10$ | | | | |
| $r_4 = +22.850$ | $d_4 = 4.25$ | $n_3 = 1.64000$ | $v_3 = 60.2$ | | |
| $r_5 = +115.012$ | $d_5 = $ Variable | | | | |
| $r_6 = +115.00$ | $d_6 = 0.86$ | $n_4 = 1.62041$ | $v_4 = 60.3$ | | |
| $r_7 = +12.941$ | $d_7 = 2.32$ | | | | |
| $r_8 = -29.426$ | $d_8 = 1.81$ | $n_5 = 1.78472$ | $v_5 = 25.7$ | | |
| $r_9 = -13.148$ | $d_9 = 0.84$ | $n_6 = 1.64000$ | $v_6 = 60.2$ | | |

-Continued

Embodiment 3 (see FIG. 3)

| | | | | | |
|---|---|---|---|---|---|
| $r_{10} = +22.105$ | $d_{10} = $ Variable | | | | |
| $r_{11} = -7.446$ | $d_{11} = 0.83$ | $n_7 = 1.67270$ | $v_7 = 32.2$ | | |
| $r_{12} = -16.451$ | $d_{12} = $ Variable | | | | |
| $r_{13} = $ | $d_{13} = 2.10$ | $n_8 = 1.71300$ | $v_8 = 53.9$ | | |
| $r_{14} = -12.905$ | $d_{14} = 9.00$ | | | | |
| $r_{15} = +9.269$ | $d_{15} = 3.43$ | $n_9 = 1.74330$ | $v_9 = 49.2$ | | |
| $r_{16} = -40.000$ | $d_{16} = 0.80$ | $n_{10} = 1.74400$ | $v_{10} = 44.9$ | | |
| $r_{17} = -276.78$ | $d_{17} = 2.14$ | | | | |
| $r_{18} = -11.104$ | $d_{18} = 2.87$ | $n_{11} = 1.78472$ | $v_{11} = 25.7$ | | |
| $r_{19} = +11.104$ | $d_{19} = 2.04$ | | | | |
| $r_{20} = +255.20$ | $d_{20} = 2.23$ | $n_{12} = 1.62041$ | $v_{12} = 60.3$ | | |
| $r_{21} = -12.686$ | $d_{21} = 0.60$ | | | | |
| $r_{22} = +19.386$ | $d_{22} = 2.00$ | $n_{13} = 1.62041$ | $v_{13} = 60.3$ | | |
| $r_{23} = -31.724$ | | | | | |

When focal lengths are 9.0 mm, 16.2 mm and 30.0 mm, $d_5$, $d_{10}$ and $d_{12}$ are:

| $f$ | $d_5$ | $d_{10}$ | $d_{12}$ |
|---|---|---|---|
| 9.0 | 0.088 | 12.061 | 3.210 |
| 16.2 | 6.541 | 5.556 | 3.262 |
| 30.0 | 11.421 | 2.782 | 1.156. |

5. The combination of claim 1 and wherein said lens of said third means forms the seventh lens of the zoom lens while the five lens members of said fourth means respectively form the eighth, ninth, and tenth, eleventh, and twelfth lens, respectively, of the zoom lens, said eighth and ninth lenses both being positive and respectively having convex surfaces directed toward each other and each consisting of at least one lens element, said tenth lens being a negative biconcave lens, said eleventh lens being a positive lens having a rearwardly directed convex surface of greater curvature than its forwardly directed surface, and said twelfth lens being a positive lens.

6. The combination of claim 5 and wherein said eighth lens includes positive and negative lens elements cemented to each other and forming together a lens of positive refracting power.

7. The combination of claim 5 and wherein said ninth lens consists of positive and negative lens elements cemented to each other and together having a positive refracting power.

8. The combination of claim 5 and wherein said eighth and ninth lenses consist each only of a single lens element.

* * * * *